Figures 1, 4:
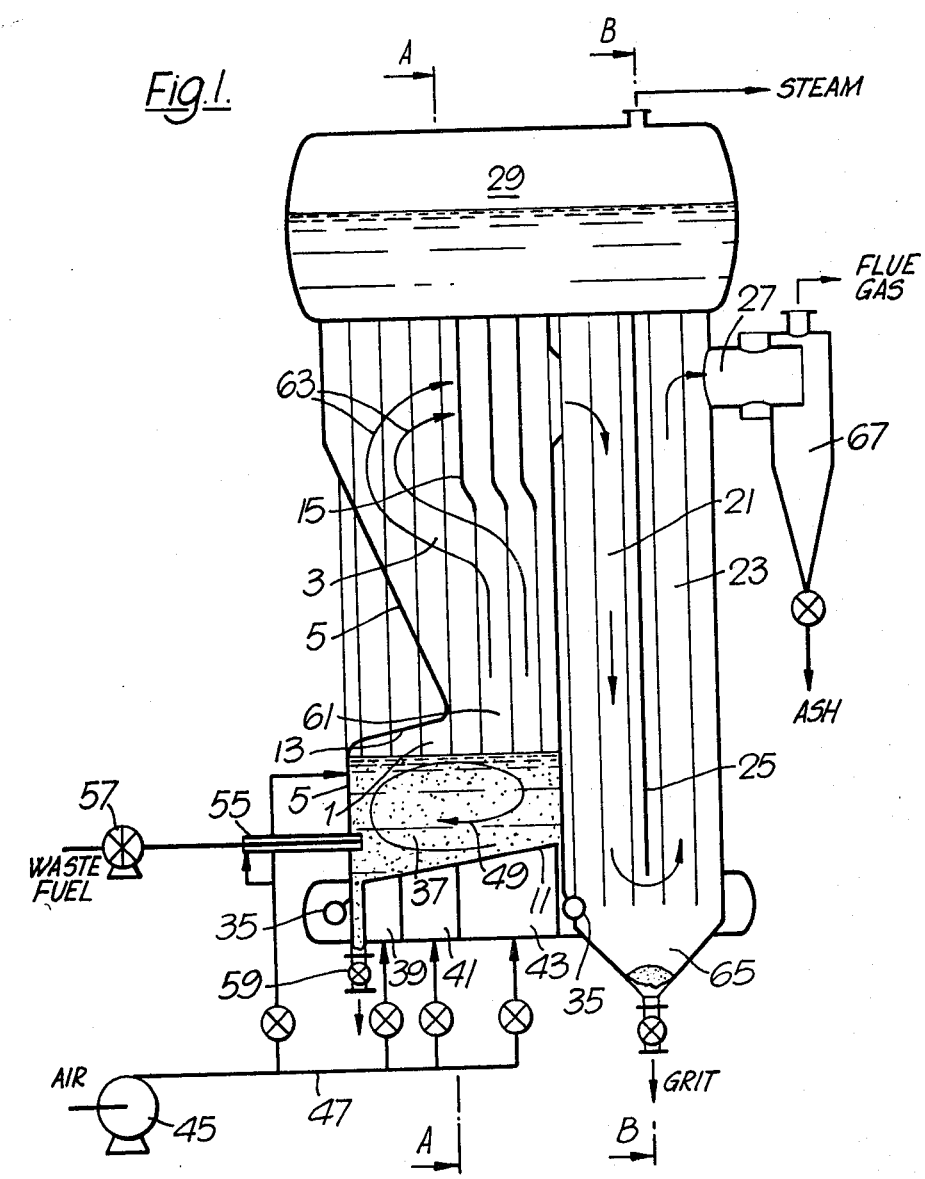

United States Patent [19]

Robinson et al.

[11] 4,270,468
[45] Jun. 2, 1981

[54] DISPOSAL OF WASTE PRODUCTS BY COMBUSTION

[75] Inventors: Edwin Robinson, Darlington; David Buckle, Billingham, both of England

[73] Assignee: Deborah Fluidised Combustion Limited, Peterlee, England

[21] Appl. No.: 43,926

[22] Filed: May 30, 1979

[30] Foreign Application Priority Data

May 31, 1978 [GB] United Kingdom ............... 25698/78

[51] Int. Cl.³ .......................... F22B 1/02; F23C 11/02; F23G 7/00
[52] U.S. Cl. .................................. 110/245; 110/346; 122/4 D
[58] Field of Search ....................... 110/245, 263, 346; 431/7, 170; 122/4 D; 432/58

[56] References Cited

U.S. PATENT DOCUMENTS

| | | | |
|---|---|---|---|
| 3,702,595 | 11/1972 | Muirhead et al. | 110/245 |
| 3,841,240 | 10/1974 | Wentworth et al. | 110/245 X |
| 3,893,426 | 7/1975 | Bryers | 110/245 X |
| 3,903,846 | 9/1975 | Elliott et al. | 122/4 D |
| 4,060,041 | 11/1977 | Sowards | 110/245 |
| 4,177,742 | 12/1979 | Uemura et al. | 110/245 X |
| 4,183,330 | 1/1980 | Bryers et al. | 122/4 D |
| 4,184,455 | 1/1980 | Talmud et al. | 110/245 X |
| 4,196,676 | 4/1980 | Brown et al. | 110/245 |

FOREIGN PATENT DOCUMENTS

| | | | |
|---|---|---|---|
| 1264345 | 2/1972 | United Kingdom . | |
| 1448196 | 9/1976 | United Kingdom | 110/245 |
| 1473742 | 5/1977 | United Kingdom | 110/245 |

Primary Examiner—John Petrakes
Attorney, Agent, or Firm—Reising, Ethington, Barnard, Perry & Brooks

[57] ABSTRACT

A method of disposing of waste products from the chemical process industries, especially as a result of the re-refining of oils. The waste products are burnt in a fluidized bed in which the bed material is fluidized in a non-uniform to effect circulation thereof so as to complete combustion at such a low temperature that the formation of sulphur trioxide and the volatilization of metals is avoided.

7 Claims, 4 Drawing Figures

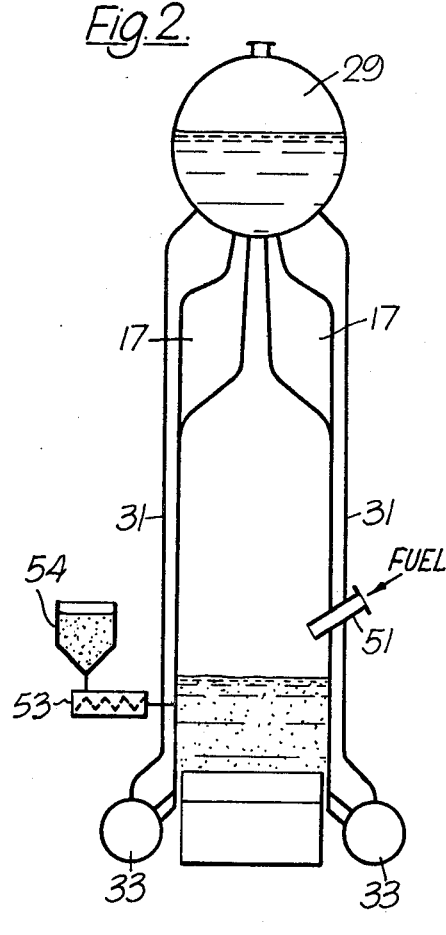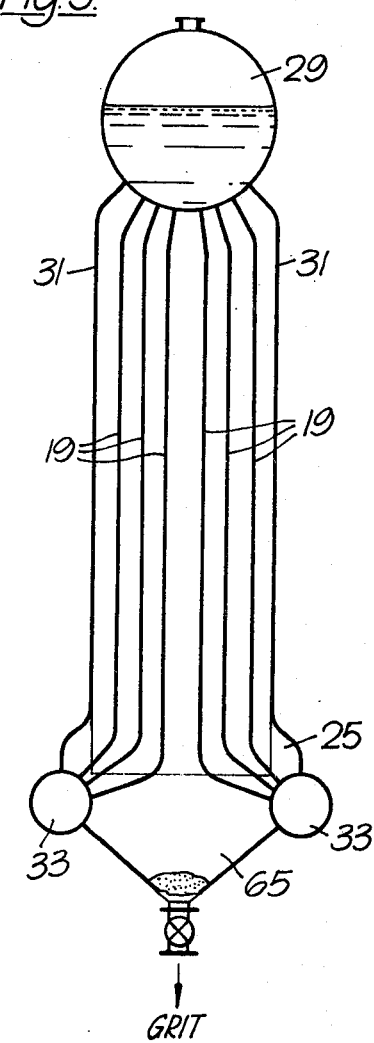

DISPOSAL OF WASTE PRODUCTS BY COMBUSTION

The invention relates to the disposal of waste products by combustion from the chemical process industries, and in particular to the waste products from the re-refining of waste lubricating oils produced by the automotive industry.

As a result of the re-refining of oils, waste products are produced which sometimes cause problems in disposal, e.g. from the "acid-earth" process one such product is known as acid tar, which is a material containing sulphuric acid and often having a significant lead content which is environmentally unsuitable for disposal to land fill. Since acid tar often has a considerable organic content its calorific value is significant, and rather than it being a liability it could be used profitably as a fuel. However, to burn acid tar it is necessary to use a combustion process specifically designed to overcome the problems encountered.

Conventional combustion processes as yet do not provide an economical or practical solution to these problems, particularly when used in conjunction with heat recovery plant.

Because of the chemical composition of the waste a considerable amount of sulphur oxides and ash are formed during combustion leading to low temperature corrosion and blockage of conventional fire tube boilers. To minimise sulphur trioxide formation which is not acceptable environmentally, it is usually necessary to burn the waste at a temperature above 1000° C. conventionally, alternatively chemical dosing may be used. Such temperatures can cause ash fusion and any lead present would volatalise giving rise to further problems environmentally. Alternatively, if chemical dosing is used to reduce sulphur trioxide formation it adds considerably to operating costs and furthermore conventional combustion processes would require pre-treatment of the waste and/or extensive flue gas treatment plant to meet environmental legislation, which again increases both operating and capital costs.

According to one aspect of the invention there is provided a method for disposing of waste products from the re-refining of oil, the method comprising feeding said waste products to combustion means which comprise a bed of particulate material, fluidising the bed in a non-uniform manner to effect circulation of the bed material within a chamber and causing the waste products to burn in said bed, such that combustion is completed without formation of sulphur trioxide or volatilisation of any metals present.

Preferably the waste products are fed to a position directly within the bed of particulate material thereby ensuring no volatilisation of the waste products above the bed. More preferably the waste products are fed to the bed within a tube, the tube being surrounded by a further tube through which air is fed. This arrangement for feeding the waste products to the bed ensures that they are kept relatively cool before emerging from the feed tube into the bed, thereby avoiding premature volatilisation or combustion ("flashing off"). In addition it allows the use of a single relatively wide feed tube since the circulation of the bed material will ensure that the fuel is distributed effectively, burning under substantially isothermal conditions within the bed. This has the advantage of simplicity of construction and also avoids the possibility of the blockages occurring, as would happen if, for instance, the waste products are pressure injected with air through small diameter nozzles as atomised droplets.

Preferably the combustion means form part of a membrane wall water tube boiler.

The present invention also provides in another aspect a membrane wall water tube boiler wherein the combustion means of the said boiler includes a bed of particulate material, means for fluidising the bed in a non-uniform manner to effect circulation and turbulence of the bed material within the combustion chamber, and means for feeding waste products from the re-refining of oil to the bed. Preferably the base of the bed is angled to the horizontal, and a part of the membrane wall, immediately above the combustion zone, slopes inwardly.

In a specific boiler disclosed herein and embodying the invention, the geometry of the said boiler/combustion chamber is such as to assist in circulation of the bed and heat transfer, creating sufficient residence time at temperature for combustion of the waste whilst minimising elutriation of the said bed. Beyond the combustion chamber the boiler geometry is such that further means are provided to reduce carry-over of the bed and assist in heat transfer to the water walls of the said boiler. The flue gases and fly ash leaving the previous chambers then enter the convection chamber which is designed to obviate blockage of the passages and provides a means for gas/particle separation.

By use of a circulating fluidised bed the combustion of acid tar or the like is so efficient that sulphur bearing wastes can be burned at a temperature of around 850° to 900° C. without the formation of sulphur trioxide. Furthermore at these temperatures, if the acid tar or the like has a lead content, this lead is not vaporised and can be removed in the form of a fine ash which is of value to the lead processing industries. Furthermore the behaviour of the circulating fluidised bed simplifies control over the said conditions and therefore maximises the superior heat transfer characteristics between a fluidised bed and its enclosing walls.

An embodiment of the present invention will now be described by way of example only, and with reference to the accompanying drawings, in which:

FIG. 1 is a diagrammatic representation of a membrane wall water tube boiler in accordance with the present invention;

FIGS. 2 and 3 being section AA and BB respectively through FIG. 1, and

FIG. 4 illustrates diagrammatically the arrangement of the membrane wall.

Referring to FIGS. 1 to 4, a boiler in accordance with the present invention comprises a combustion chamber 1 and expansion chamber 3, the whole being surrounded by a so-called membrane wall 5, the wall comprising a large number of tubes 7 each pair of adjacent tubes being separated by a narrow width of metal 9. The combustion chamber 1 is of rectangular cross-section on plan and of specific geometry on elevation (FIG. 1) due to a sloping base 11 and one side of the surrounding membrane wall 5 being shaped to form a deflector 13. Part of the membrane wall 5 surrounding the expansion chamber 3 is shaped to form deflectors 15 and exits 17 at the top of the chamber, exits 17 lead to convection tube banks 19 which are divided to form two passes 21 and 23 by baffle 25, the boiler exit 27 being at the top of the final pass 23.

All of the tubes in the boiler connect with the water/steam drum 29, water being fed to the tubes of membrane wall 5 and convection banks 19 via tubes 31 and headers 33 and 35.

The combustion chamber 1 includes a bed of particulate material 37 which may be inert, e.g. a silica sand, or alternatively it may be reactive, e.g. a calcium carbonate, which reacts with sulphur bearing fuels to form calcium sulphate, a useful compound.

The base 11 of the combustion chamber 1 is perforated to form an air distribution means being divided into sections by a plurality of plenum chambers 39, 41 and 43 to each of which air may be fed by means of pump 45 and pipes 47. The size and arrangement of the plenum chambers and/or the manner in which air may be supplied to the bed of particulate material is such that the particulate material may be caused to fluidise in a non-uniform manner so that circulation of the bed material takes place as indicated by the arrow 49. The air velocity is greatest above plenum chamber 39 and smallest above chamber 43. The deflector 13 being positioned above the area of greatest air velocity, ensures that the bed material is caused to follow the path of arrow 49.

The combustion chamber 1 includes means for preheating the bed of particulate material by a burner 51. Also provided is a facility for controlling the bed level including a schematically illustrated device 53 for detecting the amount of material in the bed and hopper means 54, responsive to said device 53, for feeding additional bed material to the chamber 1.

Waste tar or the like from chemical process industries may be fed through the membrane wall 5 to a position within the preheated bed 37 just above the distributor sections over plenums 39 and 41 via a conduit 55, comprising an arrangement of co-axial tubes. The tar is fed by pump 57 down the central tube and air is fed around this tube via pump 45 keeping the conduit 55 cool and free from blockage during operation. The bed circulation and turbulence causes rapid distribution and combustion of the tar under substantially isothermal conditions, the deflector 13 increasing the residence time of the combustion process, reducing elutriation of the particulate material and providing a greater heat transfer surface area in contact with the bed.

By this method almost fifty percent of the heat released in combustion is absorbed by the membrane walls surrounding the combustion chamber being a means for controlling the bed temperature. It has also been found that heat transfer rates vary with the rate of circulation of the bed material. Thus as the air and fuel is increased to match boiler load the heat transfer increases. Although increased air velocity would cause elutriation of bed material in conventional fluidised beds, by passing more air only through plenums 39 and 41 elutriation is avoided and bed temperature is controlled by the increased heat transfer surface provided by the deflector 13.

Any de-fluidised material such as heavy ash formed during combustion migrates to the lower end of the sloping base 11, assisted by the circulation of the bed, facilitating its removal via exit 59.

The hot flue gases and any particulate material leaving the combustion chamber 1 via exit 61 enter expansion chamber 3 which reduces the velocity of the gases such that any bed material of useable size that is carried out is disentrained falling back into the bed. Deflectors 15 cause the gases to follow a path indicated by arrow 63 thereby making efficient use of the heat transfer surface of the surrounding membrane wall 5 before leaving the chamber 3 via exits 17, the said path assisting further in the disentrainment of particles.

The gases and fine particulate material then flow from exits 17 down the first convection pass 21 and then upwardly through the second pass 23 directed by baffle 25. The 180° turn made by the flue gases at the base of baffle 25 causes some of the bed fines and ash to disentrain and collect in hopper 65 for subsequent removal.

The cooled flue gases having had some of the ash removed leave the boiler via exit 27 and enter the cyclone 67 for final cleaning before passing to a chimney stack for dispersal. It is probable that the ash produced by the combustion of acid tar or the like from oil re-refining processes or the like will be rich in heavy metal content and as such may have significant value as a by-product.

Preferably, the base of the bed is angled at approximately 10° to 15° to the horizontal.

Preferably, the projected area of the inwardly-sloping portion 13 of the membrane wall is approximately half the area of the bed.

We claim:

1. A method for disposing of waste tar products such as waste products from the re-refining of oil, the method comprising forming in the combustion chamber of a membrane wall water tube boiler a particulate material bed including a base which is inclined upwardly from a first end thereof to a second opposite end thereof, feeding air to said bed to effect fluidisation of said material and circulation of said material by movement thereof from said first end to said second end in an upper region of the bed and from said second end to said first end in a lower region of the bed, deflecting the fluidised material above the first end of the bed to assist the circulation of the fluidised material, heating the bed to a temperature in a range from about 850° C. to about 900° C., and feeding waste tar products to a position within the bed adjacent said first end.

2. A method according to claim 1 wherein the air is supplied through the base of the bed in a manner that agitates the bed material a progressively greater extent from said second end to said first end.

3. A method according to claim 2 wherein the waste products are fed through a tube surrounded by a further tube through which air is passed.

4. A membrane wall water tube boiler comprising: a combustion chamber including means for receiving a bed of particulate material, said bed having opposite first and second ends and a base which is inclined upwardly from said first end to said second end, means for feeding air to said bed to effect fluidisation of said material and circulation of said material by movement thereof from said first end to said second end in an upper region of the bed and from said second end to said first end in a lower region of the bed, deflection means located over the bed adjacent said first end to assist said circulation of the bed material, means for heating the bed, while fluidised, to a temperature of from about 850° C. to about 900° C., and means for feeding waste tar products such as waste products from the re-refining of oil to a position within the bed adjacent said first end.

5. A boiler, according to claim 4 wherein the means for feeding air includes perforations in the inclined base, a plurality of plenum chambers located beneath the perforated base, and means for feeding air to each of said plenum chambers.

6. A boiler according to claim 4 which includes an inclined membrane wall portion immediately above the bed adjacent the first end so as to provide said deflection means.

7. A boiler according to claim 6 wherein said waste tar products feeding means includes a first tube through which the products are passed, and a second tube that surrounds the first tube and through which air is passed.

* * * * *